United States Patent
Kim et al.

(10) Patent No.: US 7,525,336 B2
(45) Date of Patent: Apr. 28, 2009

(54) METHOD AND APPARATUS FOR TESTING LIQUID CRYSTAL DISPLAY DEVICE

(75) Inventors: Jong Dam Kim, Kyounggi-do (KR); Hyun Kyu Lee, Seoul (KR); Yong Jin Cho, Seoul (KR); See Hwa Jeong, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/034,422

(22) Filed: Feb. 20, 2008

(65) Prior Publication Data

US 2008/0136440 A1 Jun. 12, 2008

Related U.S. Application Data

(62) Division of application No. 11/391,569, filed on Mar. 29, 2006, now Pat. No. 7,358,756, which is a division of application No. 10/669,460, filed on Sep. 25, 2003, now Pat. No. 7,046,030.

(30) Foreign Application Priority Data

May 6, 2003 (KR) ...................... 10-2003-0028644

(51) Int. Cl.
*G01R 31/00* (2006.01)
*G02F 1/133* (2006.01)
(52) U.S. Cl. ........................... 324/770; 345/87; 349/54
(58) Field of Classification Search ................. 324/770; 349/54
See application file for complete search history.

(56) References Cited

U.S. PATENT DOCUMENTS

| 5,377,030 | A | 12/1994 | Suzuki et al. |
| 5,506,516 | A | 4/1996 | Yamashita et al. |
| 5,576,730 | A | 11/1996 | Shimada et al. |
| 5,657,139 | A | 8/1997 | Hayashi |
| 5,909,264 | A | 6/1999 | Fujikawa et al. |
| 6,111,620 | A * | 8/2000 | Nishiki et al. .................. 349/54 |
| 6,392,622 | B1 | 5/2002 | Ozawa |
| 6,630,840 | B2 | 10/2003 | Tomita |
| 6,828,817 | B2 | 12/2004 | Fujita |
| 6,864,703 | B2 | 3/2005 | Miyagawa et al. |
| 6,873,174 | B2 | 3/2005 | Matsunaga et al. |
| 7,358,756 | B2 * | 4/2008 | Kim et al. ................... 324/770 |
| 2004/0174183 | A1 | 9/2004 | Nojiri et al. |
| 2005/0093567 | A1 | 5/2005 | Nara et al. |

* cited by examiner

*Primary Examiner*—Ha Tran T Nguyen
*Assistant Examiner*—Emily Y Chan
(74) *Attorney, Agent, or Firm*—Birch, Stewart, Kolasch & Birch, LLP (57) ABSTRACT

A method and apparatus for testing a liquid crystal display device are provided to detect a defect location precisely and rapidly without requiring a jig. The method includes providing an inspection apparatus as a removable portion of the liquid crystal display device; inspecting the display part of the liquid crystal display device using the inspection apparatus; removing the inspection apparatus from the liquid crystal display device after the inspection is completed; and attaching driving circuits to the liquid crystal display device having the inspection apparatus removed therefrom.

2 Claims, 8 Drawing Sheets

METHOD AND APPARATUS FOR TESTING LIQUID CRYSTAL DISPLAY DEVICE

This application is a Divisional of U.S. application Ser. No. 11/391,569, filed Mar. 29, 2006 now U.S. Pat. No. 7,358,756, which is a divisional of U.S. application Ser. No. 10/669,460, filed on Sep. 25, 2003 (now U.S. Pat. No. 7,046,030, issued on May 16, 2006), the entire contents of which are hereby incorporated by reference and for which priority is claimed under 35 U.S.C. §120. The present application claims, under 35 U.S.C. § 119, the priority benefit of Korean Patent Application No. P2003-28644, filed May 6, 2003, the entire contents of which are herein fully incorporated by reference.

BACKGROUND OF THE INVENTION

1. Field of the Invention

The present invention relates in general to a liquid crystal display (LCD) device and, more particularly, to a method and apparatus for testing an LCD device to detect a defective location on the LCD device precisely and rapidly without requiring a jig.

2. Description of the Related Art

Display apparatuses have become important as visual information transferring media. Among the display apparatuses, a cathode ray tube is widely used at present, but is disadvantageous in that its weight and volume are large. Therefore, various types of flat display apparatuses have been developed that are capable of overcoming the defects of the cathode ray tube. An LCD, a field emission display (FED), a plasma display panel (PDP), and an electroluminescence (EL) display are different examples of flat display apparatus. Most of these apparatuses are available in the market.

The LCD device is easily adaptive due its smallness which improves productivity. Thus, it is quickly replacing the cathode ray tubes in many applications. In particular, the LCD device of an active matrix type for driving a liquid crystal cell by using a thin film transistor (hereinafter referred to as "TFT") has an advantage in that the picture quality it provides is excellent, and its power consumption is low. Such LCDs have been rapidly developed into a large size and high definition due to the recent productivity technology and research.

Figure 1:
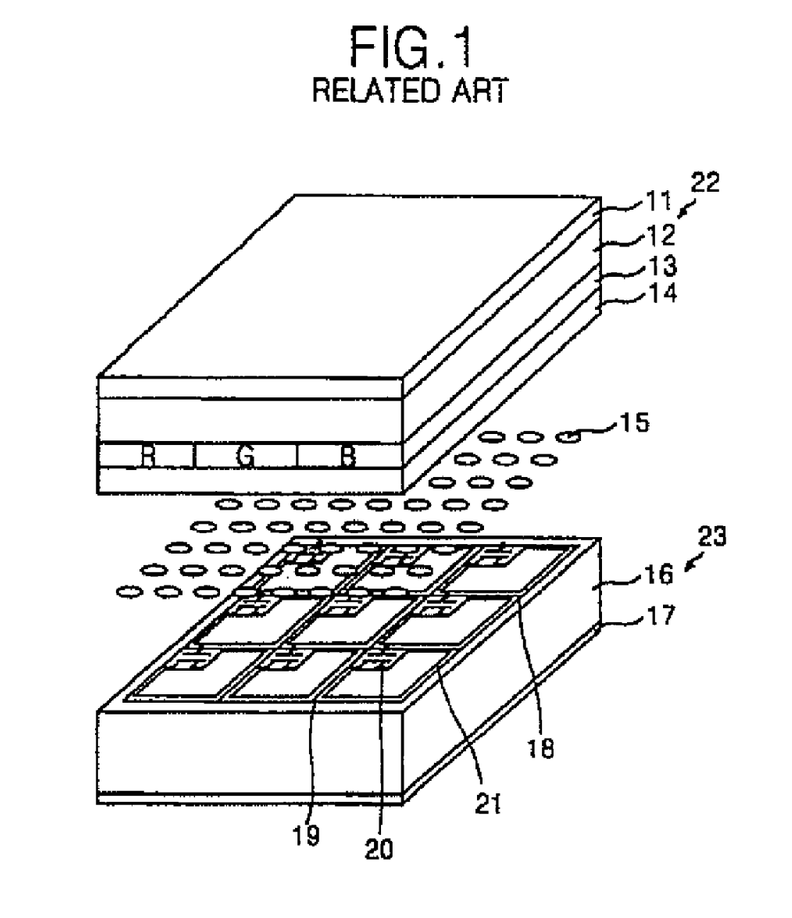
FIG. 1 is a perspective view illustrating a liquid crystal display device of an active matrix type of the related art.

As shown in FIG. 1, in the LCD of the active matrix type, a color filter substrate 22 and a TFT array substrate 23 are assembled with a liquid crystal layer 15 therebetween. The LCD shown in FIG. 1 represents a portion of a total effective display.

The color filter substrate 22 includes an upper glass substrate 12, and a color filter 13 and a common electrode 14 formed thereon. Attached on a front surface of the upper glass substrate 12 is a polarization plate 11. In the color filter 13, the color filter layers of red, green and blue colors are disposed and transmit a light of special wavelength bandwidth to display a color. A black matrix (not shown) is formed between the color filters 13 of the adjacent color.

Data lines 19 and gate lines 18 cross each other on the entire surface of a lower glass substrate 16 in the TFT array substrate 23. TFTs 20 are formed at the intersections of the gate and data lines 18 and 19. A pixel electrode 21 is formed at a cell region between each of the data lines 19 and gate lines 18 on the entire surface of the lower glass substrate 16. Each TFT 20 switches a data transfer path between the corresponding data line 19 and the corresponding pixel electrode 21 in response to a scanning signal from the corresponding gate line 18 and thus drives the corresponding pixel electrode 21. A polarization plate 17 is installed on a rear surface of the TFT array substrate 23.

The liquid crystal layer 15 adjusts a transmitting quantity of an incident light via the TFT array substrate 23 in response to an electric field applied thereto. The polarization plates 11 and 17 installed on the color filter substrate 22 and the TFT array substrate 23 transmit the light polarized to one direction. When the liquid crystal layer 15 is at 90°TN mode, the polarization directions of the polarization plates 11 and 17 vertically cross each other. An alignment film (not shown) is formed on the facing surfaces of the color filter substrate 22 and the TFT array substrate 23.

A process for fabricating the LCD device of the active matrix type is divided into a substrate cleaning, a substrate patterning, an alignment forming/rubbing, a substrate assembling/a liquid crystal material injecting, a mounting, an inspecting and a repairing.

Generally, impurities on the substrate surface of the LCD device are removed by a detergent in the substrate cleaning process. The substrate patterning process is divided into a patterning process of the color filer substrate and a patterning process of the TFT array substrate. The alignment film forming/rubbing process involves applying an alignment film to each of the color filter substrate and the TFT array substrate and rubbing the alignment film. The substrate assembling/liquid crystal injecting process is to assemble the color filter substrate and the TFT array substrate by using a sealant, to inject the liquid crystal and a spacer through a liquid crystal injection hole and then to seal the liquid crystal injection hole.

In the mounting process of the liquid crystal panel, a tape carrier package (hereinafter referred to as "TCP") is connected to a pad part on the substrate, wherein the TCP has integrated circuits mounted thereon such as a gate drive integrated circuit and a data drive integrated circuit. Such drive integrated circuits may be directly mounted on the substrate by using a chip on glass (hereinafter referred to as "COG") method besides a TAB (Tape Automated Bonding) using the TCP described above.

The inspecting process includes a first electrical inspection performed after forming a variety of signal wirings such as the data line and the gate line on the TFT array substrate and the pixel electrode, and a second electrical inspection and a visual inspection performed after the substrate assembly/liquid crystal injection process. Specifically, the electrical inspection of the signal wirings of the TFT array substrate and the pixel electrode of the lower substrate performed before the substrate assembling process may reduce an undesirable ratio and a waste matter and may find a defective substrate capable of repairing at an early stage.

The repairing process performs a restoration for a repairable substrate determined by the inspecting process. However, in the inspecting process, defective substrates beyond repair are discarded.

Figure 2:
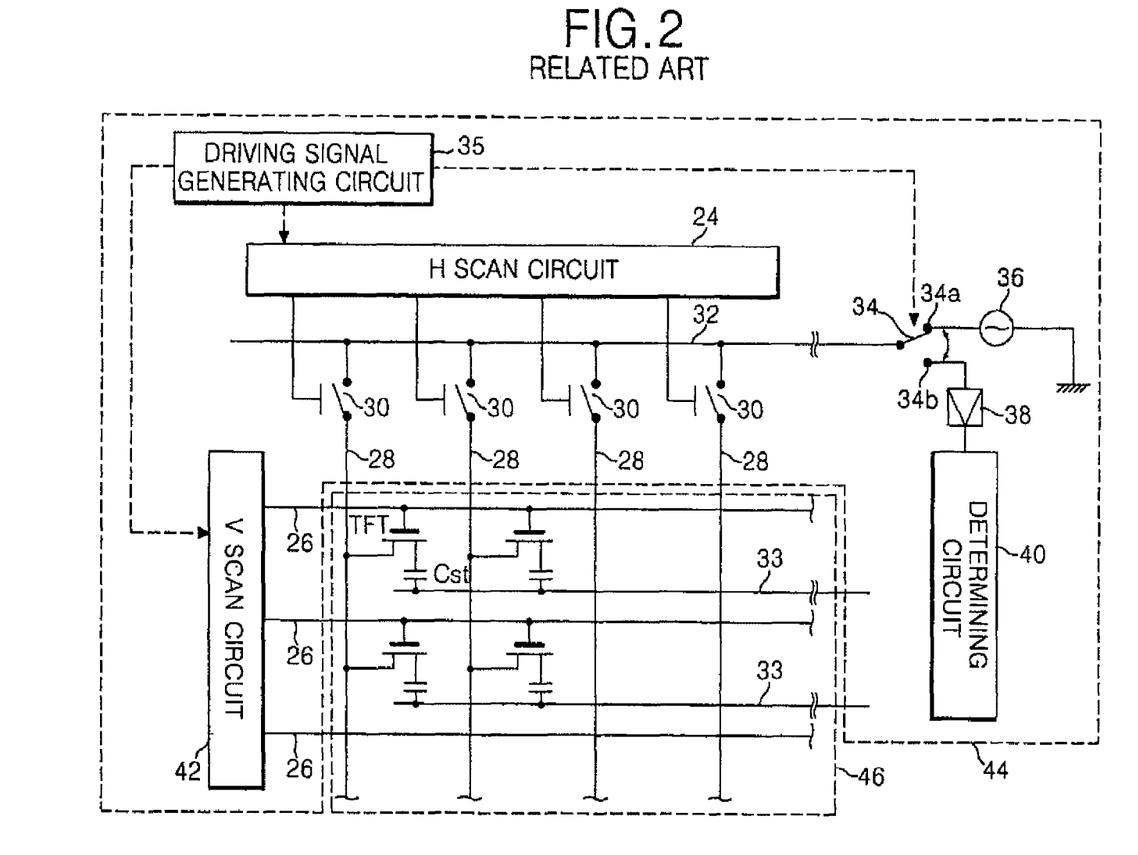
FIG. 2 is a circuit diagram illustrating an inspection device of the related art for inspecting a liquid crystal display device.

The device as shown in FIG. 2 may be used in an inspection process carried out before the substrate assembling. The inspection device shown in FIG. 2 is fully described in U.S. Pat. No. 5,377,030.

Referring to FIG. 2, the inspection device of the related art includes an inspection switch device 34 for selectively supplying a voltage from an inspection power supply 36 to a video signal input wiring, and a voltage from a current-voltage amplifier 38 under the control of a driving signal generation unit 35, a scanning switch device 30 for supplying the inspection voltage from the video signal input wiring 32 to the data lines 28 of a TFT array 46 of an active matrix LCD under control of an H scanning circuit 24, a V scanning circuit 42 for driving the gate lines 26 of the TNT array 46 under control of the driving signal generation unit 35, and a determining unit 40 for determining an electrical defect in the TFT array 46.

The data lines 28 and gate lines 26 cross each other in the TFT array 46, and TFTs are formed at their intersections. Further, common wirings 33 and a storage capacitor Cst between the common wirings 33 and a drain electrode of the TFT are formed in the TFT array 46.

The inspection of the TFT array 46 includes a sequence of loading a substrate having the TFT array 46 formed thereon to the inspection device, writing the inspection voltage to the TFT array 46 and reading a signal from the TFT array 46.

After loading the substrate having the TFT array 46 to the inspection device, the writing process of the inspection voltage is performed. In the writing process of the inspection voltage, the inspection switch device 34 is connected to the first terminal 34a and the scanning switch device 30 is turned on under control of the H scanning circuit 24. Accordingly, the inspection voltage generated from the inspection power supply 36 is supplied to the data lines 28 of the TFT array 46 via the inspection switch device 34, the video signal input wiring 32 and the scanning switch device 30. At the same time, the V scanning circuit 42 supplies a test scan voltage to the gate lines 26 under control of the driving signal generation unit 35. Then the TFTs are turned on in the selected lines of the TFT array 46, and the inspection voltage on the data lines 28 is charged to the storage capacitors Cst via the TFTs.

In the reading process of the inspection voltage, the inspection switch device 34 is connected to the second terminal 34b and the scanning switch device 30 is turned on under control of the H scanning circuit 24. At the same time, the V scanning circuit 42 supplies the test scan voltage to the gate lines 26 under control of the driving signal generation unit 35. Then, the TFTs are turned on in the selected lines of the TFT array and the voltage of the corresponding storage capacitor Cst is supplied to the current-voltage amplifier 38 via the TFTs, the data line 28, the scanning switch device 30, the video signal input wiring 32 and the inspection switch device 34. The voltage read from the storage capacitor Cst is supplied to the determining unit 40 after being amplified by the current-voltage amplifier 38, and the determining unit 40 determines if there is a defect in the TFT array 46 based on the voltage supplied by the current-voltage amplifier 38.

However, since the substrate (having the TFT array 46) to be inspected is not equipped with the driving circuit and the inspection device, a separate jig is needed to accommodate the driving signal generation unit 35, the H scan circuit 24, the V scan circuit 42, the scanning switch device 30, the video signal input wiring 32, the inspection switch device 34, the inspection power supply 36, the current-voltage amplifier 38 and the determining unit 40. As a result, there is a problem that the inspection device of the related art shown in FIG. 2 needs a high price jig. Further, if the resolution of the LCD or a model is changed, the jig needs to be changed correspondingly. On the other hand, if the TFT array 46 is inspected by a block dividing method concurrently driving a plurality of gate lines 26 and a plurality of data lines 28, the number of input/output terminals of the jig and the circuit price of the jig may be reduced. However, there is another problem that a defect location within the block cannot be detected with precision.

SUMMARY OF THE INVENTION

Accordingly, it is an object of the present invention to provide a method and apparatus for testing an LCD display device which can detect a defective location precisely and rapidly without requiring a jig.

It is another object of the present invention to provide a method and apparatus for testing an LCD which overcomes the limitations and problems of the related art.

In accordance with an aspect of the invention, a method of inspecting a liquid crystal display device using an inspection apparatus, the inspection apparatus including a light source, at least one inspection line and at least one inspection switch device connected to the inspection line, the method includes: providing a substrate, wherein the substrate includes a plurality of signal wirings, a plurality of drive switches, and a plurality of capacitors formed in an effective display area of the substrate; radiating a light generated from the light source of the inspection apparatus onto the at least one inspection switch device and thereby supplying an inspection voltage from the at least one inspection line to a corresponding one of the drive switches through the signal wirings, so as to charge a corresponding one of the capacitors; and determining if there is a defect in the effective display area of the substrate by reading the charged voltage of the corresponding one of the capacitors.

In accordance with an aspect of the invention, a method of inspecting a substrate device, the substrate device including signal wirings, drive switches and capacitors formed in a main area of the substrate device, and an inspection line and an inspection switch formed at an exterior of the main area, the drive switches being coupled to the capacitors, the inspection switch being coupled to the inspection line, the method includes: supplying an inspection voltage to the inspection line of the substrate device; charging one of the capacitors with the inspection voltage through the signal wirings; and determining if there is a defect in the substrate device by reading the charged voltage of the capacitor.

In accordance with an aspect of the invention, a method of inspecting a display part of a liquid crystal display device, the method includes: providing an inspection apparatus as a removable portion of the liquid crystal display device; inspecting the display part of the liquid crystal display device using the inspection apparatus; removing the inspection apparatus from the liquid crystal display device after the inspection is completed; and attaching driving circuits to the liquid crystal display device having the inspection apparatus removed therefrom.

In accordance with an aspect of the invention, a method of inspecting a display part of a liquid crystal display device, the method includes: providing an inspection apparatus as an integral part of the liquid crystal display device; inspecting the display part of the liquid crystal display device using the inspection apparatus; covering the inspection apparatus with a light cut-off layer after the inspection is completed; and attaching driving circuits to the liquid crystal display device after the inspection is completed.

In accordance with an aspect of the invention, an inspection apparatus for a liquid crystal display device, the liquid crystal device including a plurality of signal wirings, a plurality of driving switch devices and a plurality of capacitors formed on a substrate and formed in an effective display area of the liquid crystal display device, the apparatus includes: at least one inspection line formed at an exterior of the effective display area of the liquid crystal display device; at least one inspection switch device connected to the at least one inspection line and formed at an exterior of the effective display area; a light source to radiate light onto the at least one inspection switch device, so as to turn on the at least one inspection switch device and to charge an inspection voltage from the at least one inspection line onto one of the capacitors; and a control part to read the charged voltage of the one of the capacitors and thereby determine if there is a defect in the effective display area of the liquid crystal display device.

In accordance with an aspect of the invention, an apparatus for inspecting a substrate of a liquid crystal display device, the substrate including a plurality of signal wirings, a plurality of drive switches and a plurality of capacitors formed in an effective display area of the substrate, the apparatus includes: a light source to radiate light; at least one inspection line formed at an exterior of the effective display area of the substrate; at least one inspection switch device connected to the at least one inspection line and formed at an exterior of the effective display area of the substrate, wherein the at least one inspection switch device is radiated with the light from the light source so as to be turned on to supply an inspection voltage of the at least one inspection line to a corresponding one of the drive switches, whereby a corresponding one of the capacitors is charged through the signal wirings; and a determining part to determine if there is a defect in the effective display area of the substrate by reading the charged voltage of the corresponding one of the capacitors.

In accordance with an aspect of the invention, a display part of a liquid crystal display device, includes: a substrate; a display circuit on the substrate for performing a display function of the liquid crystal display device; and an inspection apparatus formed at an exterior of the display circuit and being a removable portion of the liquid crystal display device, wherein after the display circuit is inspected for any defect using the inspection apparatus, the inspection apparatus is removed from the liquid crystal display device.

In accordance with an aspect of the invention, a display part of a liquid crystal display device, includes: a substrate; a display circuit on the substrate for performing a display function of the liquid crystal display device; an inspection apparatus formed as an integral part of the liquid crystal display device at an exterior of the display circuit; and a light cut-off layer covering the inspection apparatus after the display circuit is inspected using the inspection apparatus; and driving circuits attached to the liquid crystal display device after the display circuit is inspected using the inspection apparatus.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Hereinafter, as referring to FIGS. 3 to 8, the preferred embodiments of the present invention will be explained in full detail.

Figure 3:
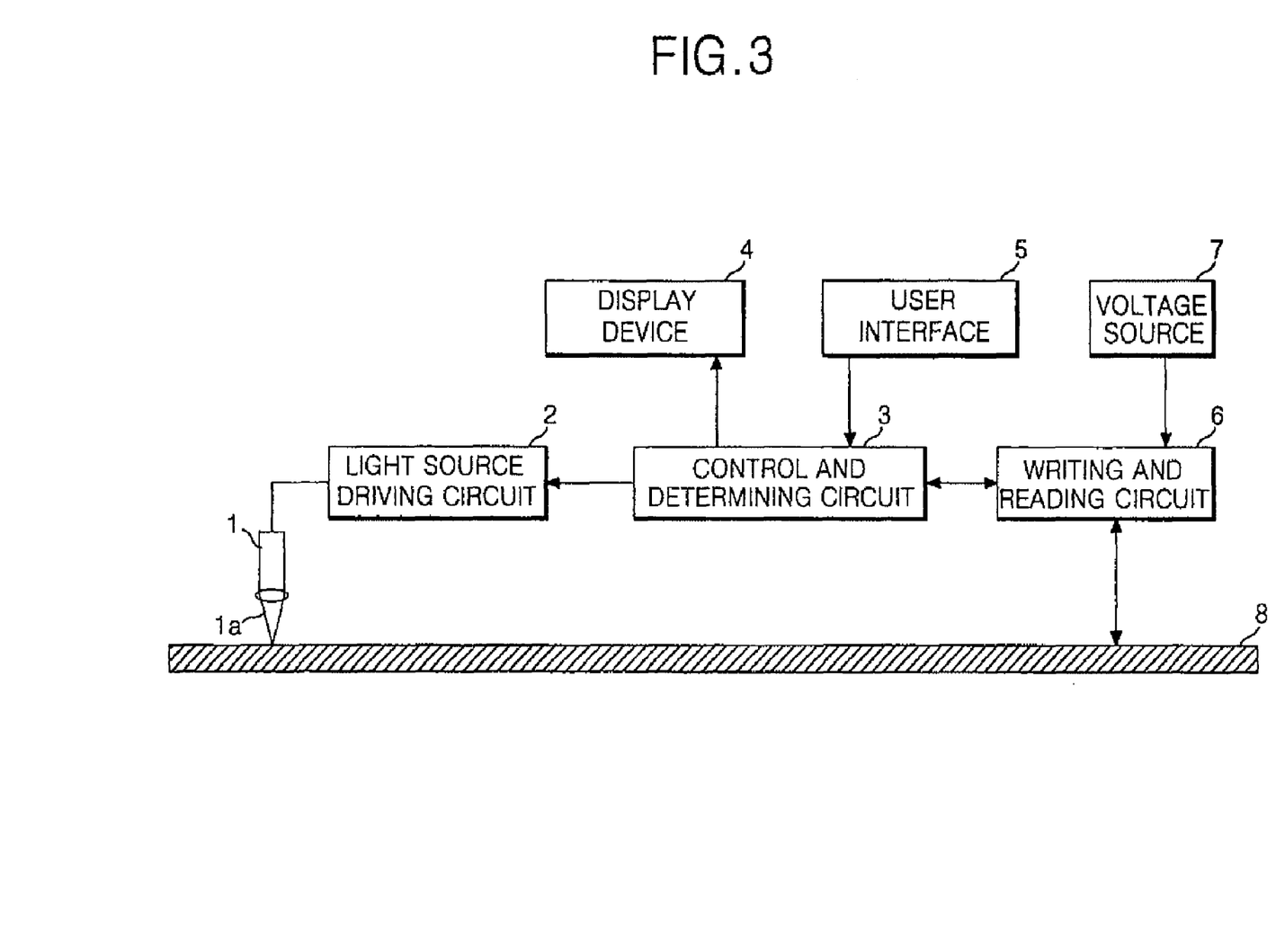
FIG. 3 is a block diagram illustrating an inspection device of a liquid crystal display device according to an embodiment of the present invention.

Referring to FIG. 3, an inspection device for a liquid crystal display according to a preferred embodiment of the present invention includes a light source 1 for radiating a light 1a on a substrate 8 to be inspected, a writing and reading circuit 6, a voltage source 7 for supplying an inspection voltage to the writing and reading circuit 6, a light source driving circuit 2 for driving the light source 1, a display device 4, and a controlling and determining circuit 3 for controlling a user interface device 5. All the components of the inspection device are operatively coupled. The substrate 8 includes a TFT array formed thereon and is part of a liquid crystal display device.

The light source 1 is driven by a power from the light source driving circuit 2 to generate the light 1a which will then be focused on the substrate 8 to be inspected.

The writing and reading circuit 6 supplies the inspection voltage from the voltage source 7 (or some other source) to an inspection terminal of the substrate 8 under control of the controlling and determining circuit 3, and reads the voltage generated in the substrate 8 in response to the inspection voltage. The writing and reading circuit 6 supplies the read voltage to the controlling and determining circuit 3.

The controlling and determining circuit 3 controls the light source driving circuit 2 to turn on or off the light source 1 and controls the writing and reading circuit 6. Further, the controlling and determining circuit 3 compares the read voltage from the writing and reading circuit 6 with a predetermined reference voltage and determines a badness/defectiveness of the substrate 8 being inspected in accordance with the comparison result. Then the controlling and determining circuit 3 generates determination result data and supplies the determination result data to the display device 4 so that the determination result can be displayed to a user or an inspection operator. This allows the user or inspection operator to recognize the defectiveness of the substrate 8 in real time. The user or inspection operator can issue a command or instruction to process the defective substrate via the user interface 5 such as a keyboard, a mouse, etc.

The controlling and determining circuit 3 can include a ROM (or other memory) having the predetermined reference data voltages stored therein in a lookup table or some other format, so that the reference voltages can be accessed and used to compare with the read voltage. The controlling and determining circuit 3 can include an operation device for performing the detect determination test for the substrate. The operation device may be implemented with one or more computer programs embodied on a computer-readable medium such as ROM, optical disc, etc.

Further, the inspection device according to the embodiment of the present invention includes a stage for moving the substrate 8 to be inspected and/or a unit for moving the light source 1 such as an actuator.

Figure 4:
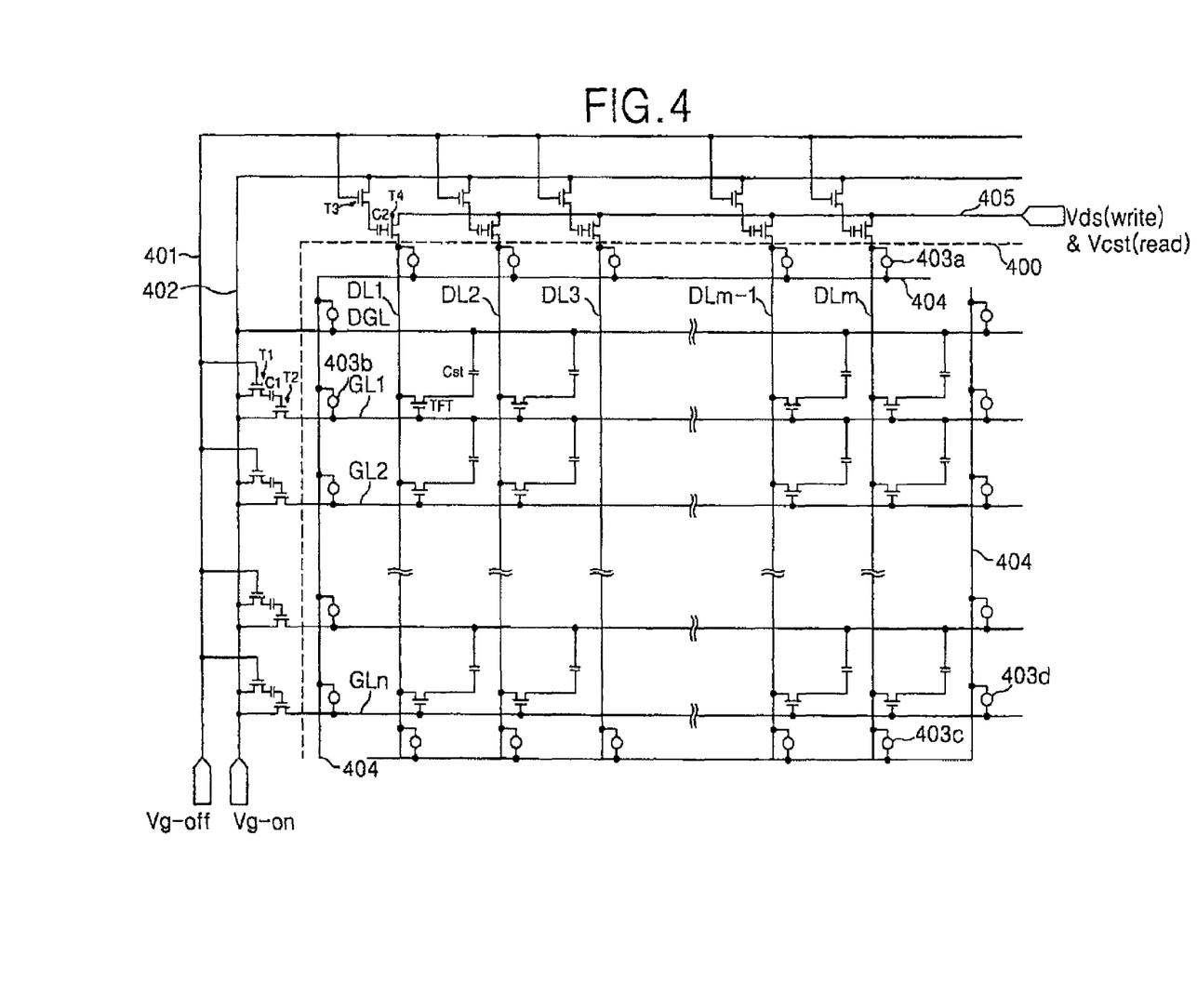
FIG. 4 illustrates a substrate of a liquid crystal display device according to an embodiment of the present invention.

FIG. 4 illustrates an example of a TFT array substrate of a liquid crystal device according to the embodiment of the present invention. For instance, the substrate 8 in FIG. 3 can be the substrate having the structure shown in FIG. 4.

Referring to FIG. 4, the TFT array substrate according to the present invention includes data lines DL1 to DLm and gate lines DGL and GL1 to GLn crossing mutually TFTs formed at the intersections of the data lines DL1 to DLm and the gate lines DGL and Gl1 to GLn, a storage capacitor Cst connected to each of the TFTs, an electrostatic damage protection line 404 crossing with the data lines DL1 to DLm and the gate lines DGL and GL1 to GLn, electrostatic damage protection devices 403a and 403c connected between the electrostatic damage protection line 404 and the data lines DL1 to DLm, and electrostatic damage protection devices 403b and 403d connected between the electrostatic damage protection line 404 and the gate lines DGL and GL1 to GLn. These components are all operatively coupled.

An inspecting voltage is applied selectively or simultaneously to the data lines DL1 to DLm during the inspecting process, whereas the video data is supplied to the data lines DL1 to DLm upon a normal driving.

The gate lines DGL and GL1 to GLn include an uppermost dummy gate line DGL not connected to the TFTs and the gate lines GL1 to GLn connected to the TFTs. The gate lines DGL and GL1 to GLn supply the inspection voltage to the TFTs during the inspection process to select a line having the inspection voltage supplied thereto, and supply the driving scan voltage to the TFTs to select the line having the video data voltage supplied thereto upon a normal driving.

The gate electrodes of the TFTs are connected to the gate lines GL1 to GLn and the source electrodes of the TFTs are connected to the data lines DL1 to DLm. The drain electrodes of the TFTs are connected to the storage capacitors Cst. Each TFT is turned on when the scan voltage higher than the threshold voltage of the corresponding TFT is supplied to the corresponding one of the gate lines GL1 to GLn, which in turn supplies the voltage on the corresponding one of the data lines Dl1 to DLm to the corresponding storage capacitor Cst.

For each TFT, the storage capacitor Cst is formed between the drain electrode of the TFT and the prestage gate line or is formed between the drain electrode of the TFT and a separate common electrode line (not shown). The storage capacitor Cst charges the inspection voltage during the inspection process and then discharges the charged voltage. The controlling and determining circuit 3 shown in FIG. 3 compares the voltage discharged from the storage capacitor Cst with a predetermined reference voltage in the inspection process, and thus determines a point of defect such as the short of the TFT and the storage capacitor, or the short and the open circuit problem of the corresponding gate line and the corresponding data line based on the comparison results.

The device for protecting an electrostatic discharge damage (hereinafter referred to as "ESD protection device") bypasses the static electricity caused during the fabricating process or the normal driving to the electrostatic damage protection line (hereinafter referred to as "ESD protection line") and thus protects the TFT array of an effective display from the static electricity. A ground voltage GND or a common voltage Vcom is supplied to the ESD protection line 404.

Further, the TFT array substrate according to the present invention includes first to third inspection lines 401, 402 and 405 formed at an outer edge portion of the TFT array of the effective display, first and third inspection TFTs T1 and T3 having their gate terminals connected to the first inspection line 401, second TFTs T2 connected between the second inspection line 402 and the gate lines GL1 to GLn of the TFT array, capacitors C1 each connected between the first and the second TFTs T1 and T2, fourth TFTs T4 connected between the third inspection line 405 and the data lines DL1 to DLm of the TFT array, and capacitors C2 each connected between the third and fourth TFTs T3 and T4.

The first inspection line 401 receives from, e.g., the voltage source 7 a gate-off voltage (Vg-off) lower than the threshold voltage of the first and the third TFTs T1 and T3 and supplies it to the TFTs T1 and T3 in the inspection process, while upon the normal driving, it is provided with no voltage.

The second inspection line 402 receives from, e.g., the voltage source 7 a gate-on voltage (Vg-on) higher than the threshold voltage of the second and the fourth TFTs T2 and T4 and supplies it to the TFTs T1, T2, and T3 in the inspection process, while upon the normal driving, it is provided with no voltage.

The third inspection line 405 receives from, e.g., the voltage source 7 the inspection voltage Vds and supplies it to the sources of the fourth TFTs T4 in the inspection process. It also receives the read voltage Vcst from the data lines DL1 to DLm. The third inspection line 405 is provided with no voltage upon the normal driving.

For each first TFT T1, the gate electrode of the first TFT T1 is connected to the first inspection line 401 and the source electrode of the first TFT T1 is connected to the second inspection line 402. The drain electrode of the first TFT T1 is connected to the capacitor C1. The first TFT T1 is turned on by a photo current generated due to the exposure to the light 1a from the light source 1 in the inspection process and thereby supplies a gate-on voltage (Vg-on) on the second inspection line 402 to the capacitor C1.

For each second TFT T2, the gate electrode of the second TFT T2 is connected to the capacitor C1 and the source electrode of the second TFT T2 is connected to the second inspection line 402. The drain electrode of the second TFT T2 is connected to the corresponding one of the gate lines GL1 to GLn. The second TFT T2 is turned on in response to the voltage of the capacitor C1 in the inspection process, and the turned-on T2 supplies the gate-on voltage (Vg-on) on the second inspection line 402 to the corresponding one of gate lines G11 to GLn and thus to the TFTs of the array connected to that gate line.

For each third TFT T3, the gate electrode of the third TFT T3 is connected to the first inspection line 401 and the source electrode of the third TFT T3 is connected to the second inspection line 402. The drain electrode of the third TFT T3 is connected to the capacitor C2. The third TFT T3 is turned on by the photo current generated due to the exposure to the light from the light source 1 in the inspection process, which supplies a gate-on voltage (Vg-on) on the second inspection line 402 to the capacitor C2.

For each fourth TFT T4, the gate electrode of the fourth TFT T4 is connected to the capacitor C2 and the source electrode of the fourth TFT T4 is connected to the third inspection line 405. The drain electrode of the fourth TFT T4 is connected to the corresponding one of the data lines DL1 to DLm. The fourth TFT T4 is turned on in response to the voltage of the capacitor C2 in the inspection process, which in turn supplies the inspection voltage Vds on the third inspection line 403 to the corresponding one of the data lines DL1 to DLm. Also, it supplies the read voltage Vcst from the corresponding one of the data lines DL1 to DLm to the third inspection line 405 for reading by the writing and reading circuit 6.

When the first and third TFTs T1 and T3 are turned on, the capacitors C1 and C2 charge the voltage and constantly supply the charged voltage to the gate terminal of the second and fourth TFTs T2 and T4, to thereby stably maintain the gate voltage of the second and fourth TFTs T2 and T4.

The inspection process on the TFT array substrate according to an embodiment of the present invention includes a sequence of loading the TFT array substrate shown in FIG. 4 or other substrate to the inspection device, writing the inspection voltage Vds to the TFT array and reading the return signal from the TFT array in response to the inspection voltage. Here, the loading step may be optional if the inspection device is part of the TFT array substrate (which will be discussed later in more detail). More specifically, the TFT array substrate shown in FIG. 4 is loaded in the inspection device and then the writing process of the inspection voltage as shown in FIG. 5 is performed.

Figure 5:
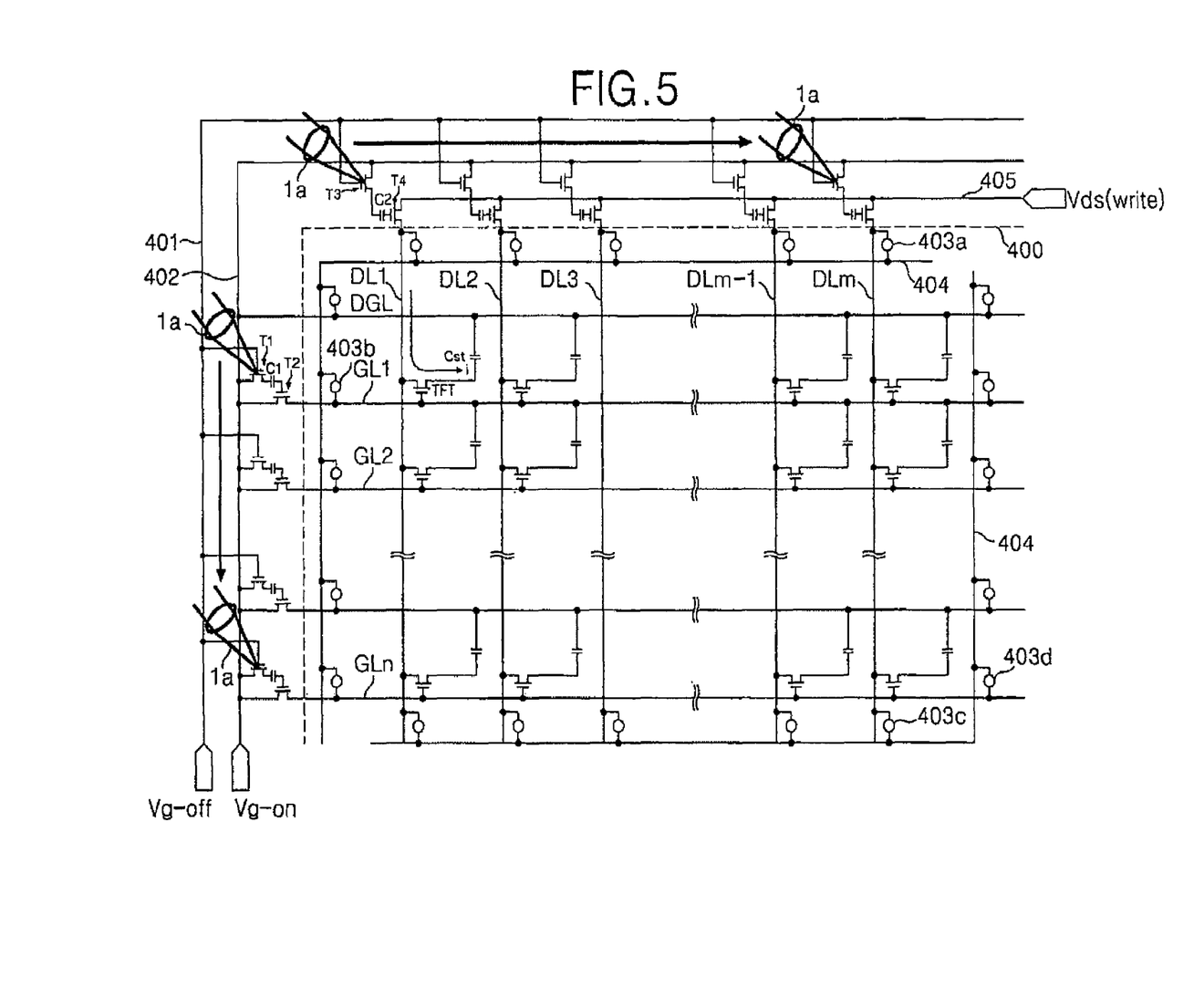
FIG. 5 is a diagram for explaining a writing process of an inspection voltage with respect to an inspection method of a liquid crystal display device according to an embodiment of the present invention.

Referring to FIG. 5, in the writing process of the inspection voltage, the inspection voltage Vds (e.g., from the voltage source 7) via the reading and writing circuit 6 shown in FIG. 3 is supplied to the third inspection line 405, and the light is radiated by the light source 1 onto a semiconductor layer of the first TFT T1 and in turn onto a semiconductor layer of the third TFT T3. In this writing process, the first TFT T1 is turned on by the photo current generated in its semiconductor layer and the second TFT T2 is turned on by the voltage of the capacitor C1. The second TFT T2, as turned on, supplies the gate-on voltage (Vg-on) on the second inspection line 402 to the corresponding one of the gate lines GL1 to GLn. Similarly, the third TFT T3 is turned on by the photo current generated in its semiconductor layer and the fourth TFT T4 is turned on by the voltage of the capacitor C2, so as to supply the inspection voltage Vds on the third inspection line 405 to the corresponding one of the data lines DL1 to DLm. Then the TFTs of the effective display area connected to the corresponding gate line are turned on to pass the inspection voltage Vds through the TFT(s) and to charge the inspection voltage Vds to the corresponding storage capacitor Cst. That is, the storage capacitor Cst charges electric charges supplied through a current path i via the third inspection line 405, the corresponding one of the data lines DL1 to DLm and the TFT in the TFT array in the writing process of the inspection voltage.

In one embodiment, the light source 1 sequentially radiates the light 1a to the first and third TFTs T1 and T3 by moving with a constant speed or moving of the stage for supporting the TFT array substrate, or simultaneously radiates the light 1a to all the first and third TFTs T1 and T3. During the sequential radiating, all the first TFTs T1 can be sequentially radiated and, at the same time or before or after, all the third TFTs T3 can be sequentially radiated. In the alternative, the first and second TFTs T1 and T3 can be selectively radiated if a particular area (e.g., a particular TFT or Cst) on the TFT array needs to be inspected. Other variations are possible.

Figure 6:
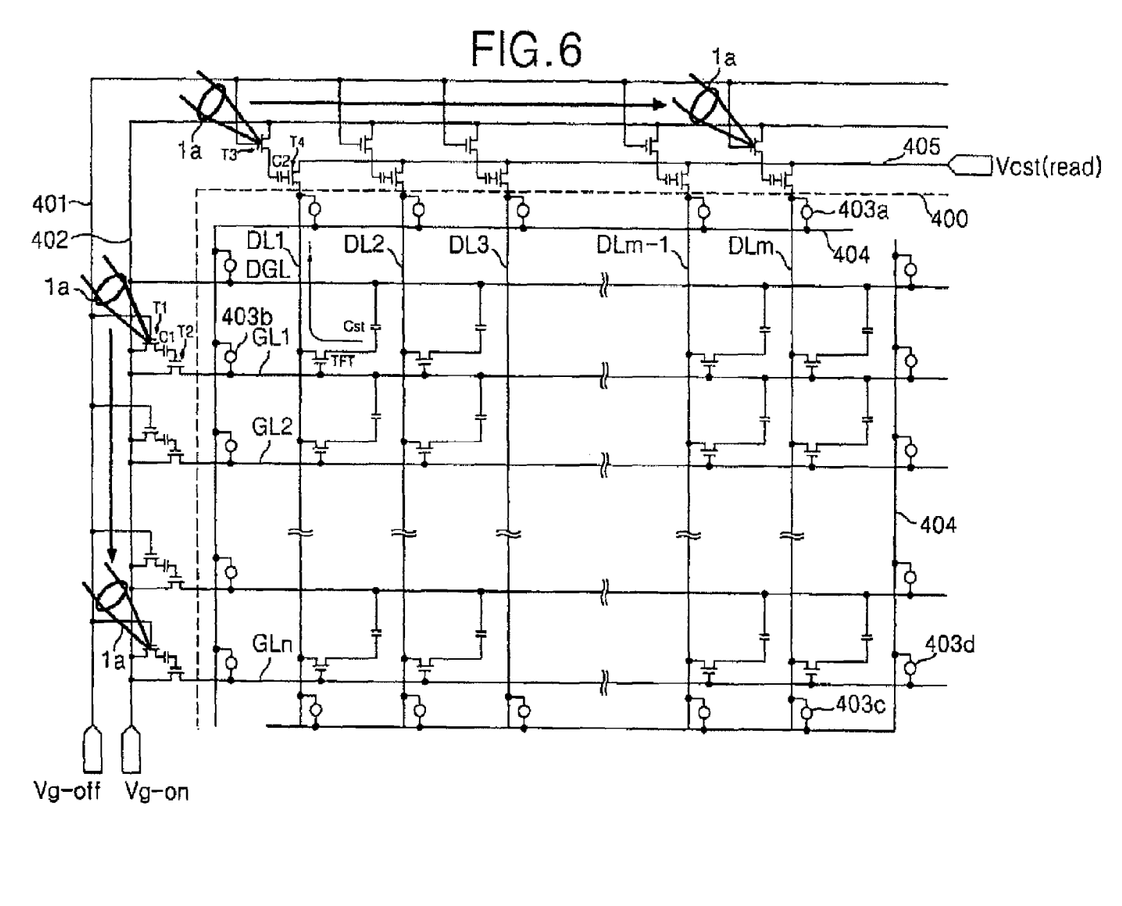
FIG. 6 is a diagram for explaining a reading process of a storage capacitor voltage with respect to an inspection method of a liquid crystal display device according to an embodiment of the present invention.

After the writing process of the inspection voltage, the reading process of the read voltage is performed, as shown in FIG. 6. Referring to FIG. 6, in the reading process of the read voltage, no voltage is applied from an external to the third inspection line 405 and the light source 1 radiates the light 1a to the semiconductor layer of the first TFT T1 and to the semiconductor layer of the third TFT T3. In the reading process, the first TFT T1 is turned on by the photo current generated in its semiconductor layer and the connected second TFT T2 is turned on by the voltage of the capacitor C1 to supply the gate-on voltage (Vg-on) on the second inspection line 402 to the corresponding one of the gate lines DGL and GL1 to GLn. Similarly, the third TFT T3 is turned on by the photo current generated in its semiconductor layer and the connected fourth TFT T4 is turned on by the voltage of the capacitor C2 to form the current path between the corresponding one of the data lines DL1 to DLm and the third inspection line 405. Consequently, the TFTs of the effective display connected to the corresponding gate line are turned on to form the current path between the storage capacitor Cst and the corresponding data lines. Then the voltage Vcst of the storage capacitor Cst (charged with the inspection voltage) is discharged along the current path including the corresponding TFT, the corresponding data line and the third inspection line 405, which will then be supplied to the writing and reading circuit 6 shown in FIG. 3.

In one embodiment, the order or manner in which the first and third TFT(s) T1 and T3 are radiated during the reading process of the inspection procedure can be the same as or reverse of the order or manner in which the first and third TFT(s) T1 and T3 are radiated in the writing process of the inspection voltage. In another embodiment, the first and third TFT(s) T1 and T3 can be radiated selectively according to an order in which particular areas of the TFT array are desired to be inspected.

The writing and reading circuit 6 amplifies the read voltage Vcst supplied from the TFT array, removes a noise therein and supplies the processed read voltage Vcst to the controlling and determining circuit 3. The controlling and determining circuit 3 compares the read voltage Vcst with a predetermined reference data voltage to determine the presence of a defect in the storage capacitor of the TFT array and in the TFT and the presence of short and/or open circuit defectiveness in the data lines DL1 to DLm and gate lines GL1 to GLn in accordance with the comparison results. The precise location of the defect can be quickly identified by examining which one of the first TFTs T1 and which one of the third TFTs T3 have been radiated to read the charge inspection voltage. This is because each of the first TFTs T1 is assigned to one of the gate lines, and each of the third TFTs T3 is assigned to one of the data lines.

The controlling and determining circuit 3 supplies the data of the read voltage Vcst and/or the comparison result to the display device 4 or other indication device to allow an inspection operator or user recognize the defect in real time.

Figure 7:
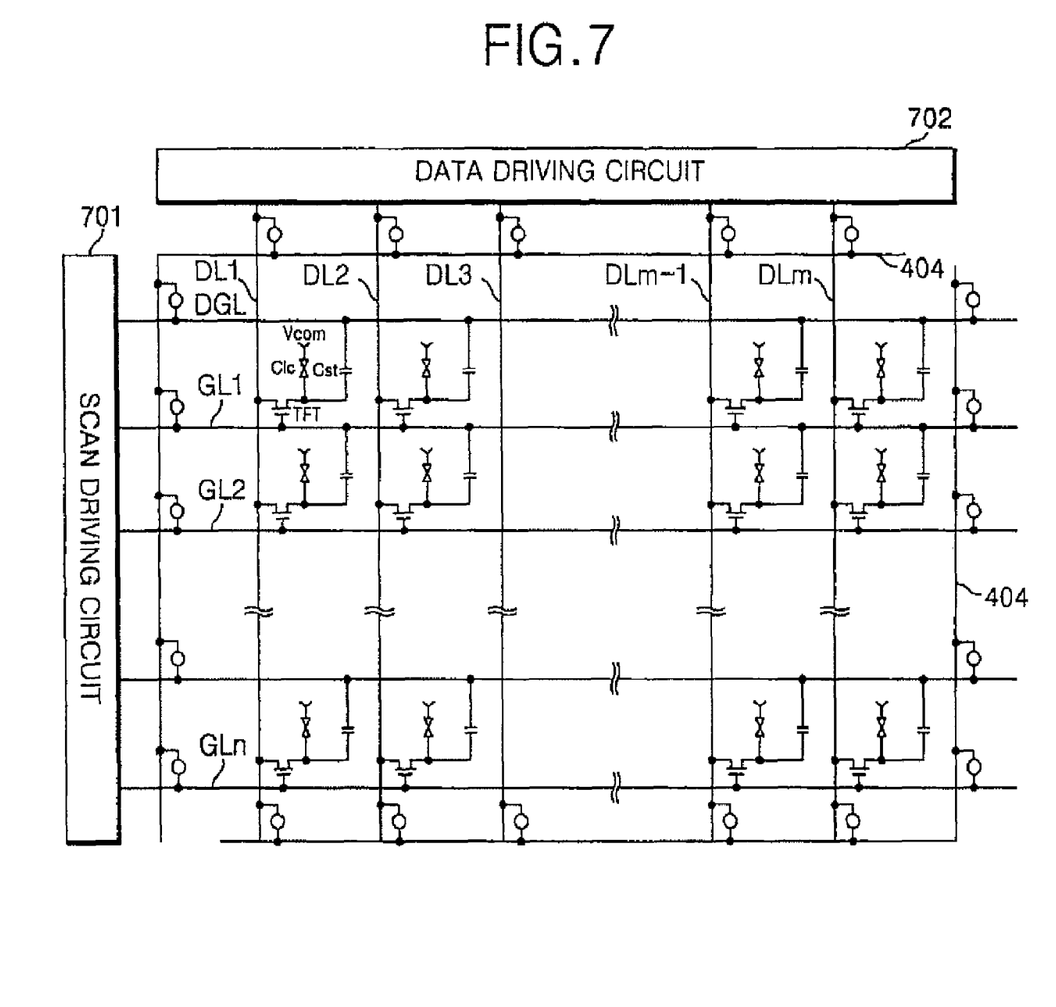
FIG. 7 illustrates a state that a data driving circuit and a gate/scan driving circuit are installed on a substrate of a liquid crystal display device after an edge of the substrate is removed along a cutting line 400 shown in FIG. 4 according to an embodiment of the present invention.

In one embodiment, the inspection device is a removable part of the TFT array substrate. In this case, the edge of the TFT array substrate is cut off along a cutting line 400 of FIG. 4 upon the scribing process. Accordingly, the first to the fourth TFTs T1 to T4, the capacitors C1 and C2 and the first to the third inspection lines 401, 402 and 405 are removed from the TFT array substrate after the inspection is completed. Then, after forming the liquid crystals Clc by the alignment film forming/rubbing process and the substrate assembling/liquid crystal injecting process, integrated circuits of a data driving circuit 702 and a scan driving circuit 701 are mounted on the TFT array substrate as shown in FIG. 7.

The data driving circuit 702 supplies video data to the data lines DL1 to DLm under control of the timing controller (not shown). The scan driving circuit 701 sequentially supplies a scan pulse to the gate lines GL1 to GLn in response to the gate start pulse from the timing controller to select the lines to which the video data voltage is supplied. This process is known.

Figure 8:
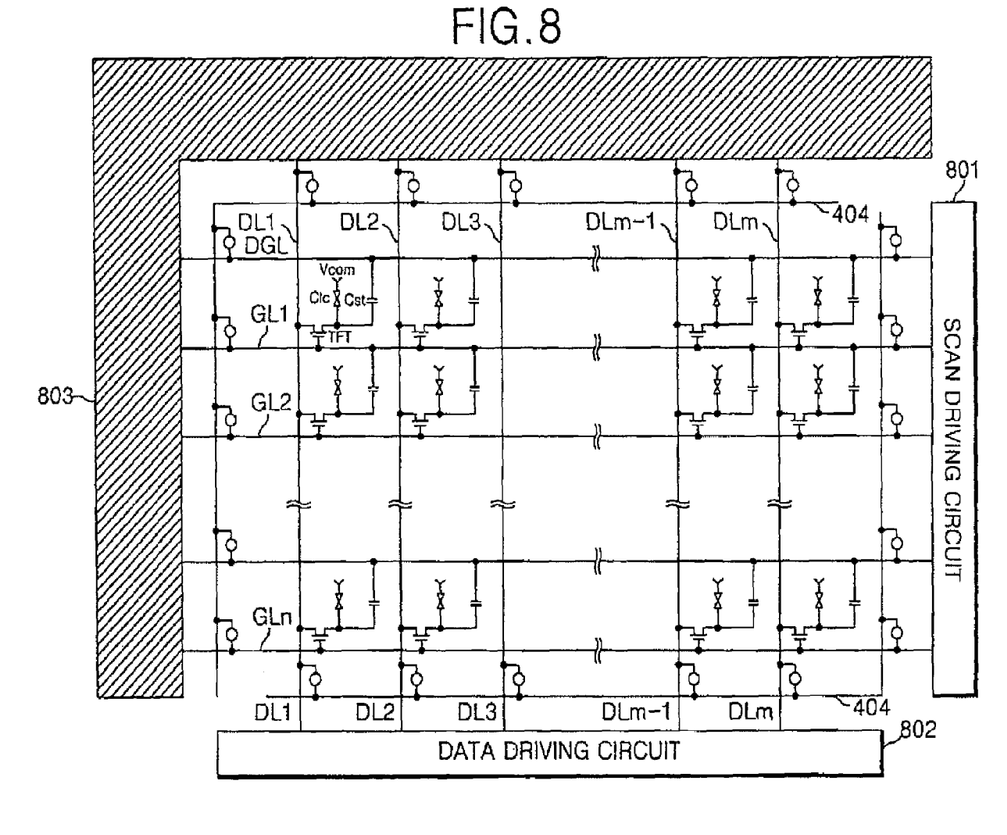
FIG. 8 illustrates a state that an inspection circuit shown in FIG. 4 is shielded with a light cutting-off layer, and a data driving circuit and a gate driving circuit are installed on a substrate of a liquid crystal display device according to another embodiment of the present invention.

In other variations, upon the scribing process, the first to the fourth TFTs T1 to T4, the capacitors C1 and C2 and the first and the third inspection lines 401, 402 and 405 may be remained on the TFT array substrate without being removed from the TFT array substrate. In this case, as shown in FIG. 8, it is preferred to form a light cut-off layer 803 covering or overlapping the inspection device including the TFTs T1 to T4 and the inspection lines, so that the TFTs T1 to T4 on the edge of the TFT array substrate do not cause a false operation. Then, after forming the liquid crystal cells Clc by the alignment film forming/rubbing process and substrate assembling/liquid crystal injecting process, the integrated circuits of a data driving circuit 802 and a scan driving circuit 801 are mounted on the TFT array substrate.

The processing steps and computer programs of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magnet-optical disc, etc. Such computer program(s) may also take the form of a signal propagating across the Internet, extranet, intranet or other network and arriving at the destination device for storage and implementation. The computer programs are readable using a known computer or computer-based device.

As described above, the method and apparatus for inspecting the liquid crystal display device provide the inspection lines and the TFTs at an edge area of the TFT array substrate, radiate the light to the TFTs in order to charge the inspection voltage to the storage capacitor of the TFT array substrate, and read the voltage of the storage capacitor of the TFT array substrate to find the defect in the TFT and the storage capacitor formed on the TFT array substrate and the short and the open circuit problems of the signal wirings. As a result, the method and apparatus for inspecting the liquid crystal display device according to the present invention do not need a separate jig and can detect the defect location precisely and rapidly.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of inspecting a display part of a liquid crystal display device, the method comprising:
   providing an inspection apparatus as a removable portion of the liquid crystal display device;
   inspecting the display part of the liquid crystal display device using the inspection apparatus;
   removing the inspection apparatus from the liquid crystal display device after the inspection is completed; and
   attaching driving circuits to the liquid crystal display device having the inspection apparatus removed therefrom,
   wherein in the attaching step, the driving circuits are attached to areas of the liquid display device where the inspection apparatus was previously located.

2. A display part of a liquid crystal display device, comprising:
   a substrate;
   a display circuit on the substrate for performing a display function of the liquid crystal display device;
   an inspection apparatus formed at an exterior of the display circuit and being a removable portion of the liquid crystal display device; and
   driving circuits attached to the exterior of the display circuit once the inspection apparatus Is removed,
   wherein after the display circuit is inspected for any defect using the inspection apparatus, the inspection apparatus is removed from the liquid crystal display device.

* * * * *